(12) United States Patent
Zhou et al.

(10) Patent No.: US 11,094,292 B2
(45) Date of Patent: Aug. 17, 2021

(54) BACKLIGHT MODULE, DISPLAY PANEL AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Jinzhao Zhou, Beijing (CN); Jian Zhang, Beijing (CN); Tingting Zhao, Beijing (CN); Litao Fan, Beijing (CN); Meiling Jin, Beijing (CN); Lulu Li, Beijing (CN); Liangliang Li, Beijing (CN); Yujie Liu, Beijing (CN); Yingxue Yu, Beijing (CN); Qin Xin, Beijing (CN); Cai Zheng, Beijing (CN); Yahui Niu, Beijing (CN); Zhiqiang Zhang, Beijing (CN); Jiao Chang, Beijing (CN)

(73) Assignees: BEIJING BOE OPTOELECTRONICS TECHNOLOGY CO., LTD., Beijing (CN); BOE TECHNOLOGY GROUP CO., LTD., Beiiing (CN)

(*) Notice: Subject to any disclaimer, the term of this patent is extended or adjusted under 35 U.S.C. 154(b) by 0 days.

(21) Appl. No.: 16/816,812

(22) Filed: Mar. 12, 2020

(65) Prior Publication Data

US 2021/0158776 A1 May 27, 2021

(30) Foreign Application Priority Data

Nov. 27, 2019 (CN) .......................... 201911183817.6

(51) Int. Cl.
*G09G 3/34* (2006.01)
*G09G 5/10* (2006.01)
(Continued)

(52) U.S. Cl.
CPC ......... *G09G 5/10* (2013.01); *G02F 1/133602* (2013.01); *G06F 3/0416* (2013.01);
(Continued)

(58) Field of Classification Search
CPC ................... G09G 5/10; G09G 3/3696; G09G 2320/0633; G06F 3/0416; G02F 1/133602; G02F 1/133612
See application file for complete search history.

(56) References Cited

U.S. PATENT DOCUMENTS 3,653,745 A * 4/1972 Mao .......................... G09G 3/18
345/52
3,740,717 A * 6/1973 Huener ................. G04G 9/0047
345/53
(Continued)

*Primary Examiner* — Jose R Soto Lopez
(74) *Attorney, Agent, or Firm* — Collard & Roe, P.C.

(57) ABSTRACT

Embodiments of the present application provide a backlight module, a display panel and a display device. The backlight module includes a metal backplate, a control unit, and a switch, a metal backplate is applied with a coupling voltage under an electric field coupling action, the switch includes a control terminal, a first terminal and a second terminal, the first terminal is electrically connected with the metal backplate, and a second terminal is grounded, the control unit is electrically connected with the metal backplate and the control terminal of the switch, respectively, the control unit controls whether the switch is turned on or turned off depending on a value of the coupling voltage, and the control unit controls whether the metal backplate is grounded.

13 Claims, 6 Drawing Sheets

(51) Int. Cl.
  *G09G 3/36*    (2006.01)
  *G02F 1/13357* (2006.01)
  *G06F 3/041*   (2006.01)
  *G02F 1/1335*  (2006.01)

(52) U.S. Cl.
  CPC ..... *G09G 3/3696* (2013.01); *G02F 1/133612* (2021.01); *G09G 2320/0633* (2013.01)

(56) References Cited

U.S. PATENT DOCUMENTS

| | | | | |
|---|---|---|---|---|
| 3,912,977 | A * | 10/1975 | Fillmore | H02H 3/50 361/92 |
| 4,019,178 | A * | 4/1977 | Hashimoto | G09G 3/18 345/53 |
| 4,050,064 | A * | 9/1977 | Hashimoto | G09G 3/18 345/52 |
| 4,551,716 | A * | 11/1985 | Saito et al. | G09G 3/18 341/33 |
| 5,184,082 | A * | 2/1993 | Nelson | G09G 3/006 324/537 |
| 5,903,248 | A * | 5/1999 | Irwin | G09G 3/3659 345/90 |
| 6,051,937 | A * | 4/2000 | Dunphy | H01J 29/028 315/291 |
| 2008/0055222 | A1 * | 3/2008 | Chen | G09G 3/3648 345/90 |
| 2008/0136765 | A1 * | 6/2008 | Neugebauer | G09G 3/3677 345/98 |
| 2010/0110035 | A1 * | 5/2010 | Selker | G06F 3/0412 345/174 |
| 2010/0265168 | A1 * | 10/2010 | Neugebauer | G09G 3/3651 345/87 |
| 2013/0293523 | A1 * | 11/2013 | Chan | G02B 26/001 345/212 |
| 2014/0292711 | A1 * | 10/2014 | Teranishi | G09G 3/3696 345/174 |
| 2015/0091846 | A1 * | 4/2015 | Small | G06F 3/04166 345/174 |
| 2015/0295016 | A1 * | 10/2015 | Liu | H01L 27/3232 345/5 |
| 2015/0338994 | A1 * | 11/2015 | Hung | G06F 3/04166 345/174 |
| 2015/0378511 | A1 * | 12/2015 | Wu | G06F 3/04182 345/174 |
| 2016/0117986 | A1 * | 4/2016 | Wang | G09G 3/3258 345/212 |
| 2016/0188090 | A1 * | 6/2016 | Lu | G06F 3/044 345/174 |
| 2016/0196803 | A1 * | 7/2016 | Reynolds | G06F 3/0412 345/174 |
| 2016/0225321 | A1 * | 8/2016 | Sim | G09G 3/344 |
| 2017/0139529 | A1 * | 5/2017 | Ting | G06F 3/04166 |
| 2017/0220184 | A1 * | 8/2017 | Liu | G06F 3/0446 |
| 2017/0308212 | A1 * | 10/2017 | Jin | G06F 3/0445 |
| 2018/0107300 | A1 * | 4/2018 | Lin | G06F 3/04166 |
| 2018/0129339 | A1 * | 5/2018 | Huang | G06F 3/0446 |
| 2019/0056834 | A1 * | 2/2019 | Blondin | G06F 3/041662 |
| 2019/0073076 | A1 * | 3/2019 | Kuo | G01L 1/14 |
| 2019/0108795 | A1 * | 4/2019 | Lauber | G09G 3/34 |
| 2019/0122617 | A1 * | 4/2019 | Sim | G09G 3/2007 |
| 2019/0172401 | A1 * | 6/2019 | Sim | G09G 3/344 |
| 2019/0266956 | A1 * | 8/2019 | Sim | G09G 3/344 |
| 2019/0278412 | A1 * | 9/2019 | Byeon | G06F 3/044 |
| 2020/0026143 | A1 * | 1/2020 | Lin | G09G 3/344 |
| 2020/0033978 | A1 * | 1/2020 | Xiang | G09G 3/3225 |
| 2020/0050341 | A1 * | 2/2020 | Tabata | G06F 3/041661 |
| 2020/0142523 | A1 * | 5/2020 | Huang | G06F 3/0416 |
| 2020/0272267 | A1 * | 8/2020 | Xu | G06F 3/0416 |

* cited by examiner

BACKLIGHT MODULE, DISPLAY PANEL AND DISPLAY DEVICE

CROSS REFERENCE TO RELATED APPLICATIONS

Applicant claims priority under 35 U.S.C. § 119 of Chinese Application No. 201911183817.6 filed on Nov. 27, 2019, the disclosure of which is incorporated by reference.

TECHNICAL FIELD

The application relates to a backlight module, a display panel and a display device.

BACKGROUND

The backlight module is one of essential structures of a Liquid Crystal Display (LCD), which provides a light source with sufficient brightness and uniform distribution, so that the LCD enables displaying an image normally.

In order to ensure reliability of the display panel, a current backlight module uses a metal backplate, although the metal backplate is able to significantly enhance shock-resistance, anti-drop performance of the display panel. However, the display panel has a plurality of conductive film layers, when there is a signal flowing through a certain conductive film layer, the conductive film layer and the metal backplate constitute an equivalent capacitor, and then this signal equals to a voltage applied on the above equivalent capacitor. If this signal has a voltage of a higher change frequency, for example, this signal is a pulse modulation signal, then a certain film layer in the display panel may vibrate due to the electrostriction effect, thus causing a screen body whistle.

SUMMARY OF THE INVENTION

Embodiments of the present application provide a backlight module, a display panel and a display device.

In a first respect, an embodiment of the present application provides a backlight module including a metal backplate, a control unit, and a switch, the metal backplate is applied with a coupling voltage under an electric field coupling action, a switch comprises a control terminal, a first terminal and a second terminal, the first terminal is electrically connected with the metal backplate, and a second terminal is grounded, the control unit is electrically connected with the metal backplate and the control terminal of the switch, separately, and the control unit controls whether the switch is turned on depending on a value of the coupling voltage, thereby controlling whether the metal backplate is grounded.

Optionally, the backlight module further includes a transient diode, one terminal of the transient diode is electrically connected with the metal backplate, and the other terminal of the transient diode is grounded.

Optionally, the coupling voltage is a pulse modulation signal, a peak value of a peak of the pulse modulation signal is larger than a first specific potential; the switch comprises a first transistor, the first transistor is an N-type metal-oxide-semiconductor transistor, a gate of the first transistor is the control terminal of the switch, a drain of the first transistor is the first terminal of the switch, and a source of the first transistor is the second terminal of the switch.

Optionally, the first specific potential is a ground potential, and the control unit is a first voltage comparator, the first voltage comparator comprises a first input terminal, a second input terminal, a first voltage terminal, a second voltage terminal, and an output terminal; both the first input terminal and the second voltage terminal are grounded, the second input terminal is electrically connected with the metal backplate, the first voltage terminal is electrically connected with a positive-voltage input terminal of a power supply, and the output terminal is electrically connected with the gate of the first transistor.

Optionally, the control unit is a first inverter, and the first inverter comprises a second transistor, a third transistor, and an output terminal; the second transistor is a P-type metal-oxide-semiconductor transistor, the third transistor is an N-type metal-oxide-semiconductor transistor; both a gate of the second transistor and a gate of the third transistor are electrically connected with the metal backplate, a source of the second transistor is electrically connected with a positive-voltage input terminal of a power supply, a source of the third transistor is grounded, both a drain of the second transistor and a drain of the third transistor are electrically connected with the output terminal, and the output terminal is electrically connected with the gate of the first transistor; and the first specific potential is a turn-on voltage of the third transistor.

Optionally, a peak value of a valley of the pulse modulation signal is less than the turn-on voltage of the third transistor, and a turn-on voltage of the second transistor is set such that the second transistor is turned on at the valley of the pulse modulation signal.

Optionally, the coupling voltage is a pulse modulation signal, a peak value of a valley of the pulse modulation signal is less than a second specific potential; and the switch comprises a fourth transistor, the fourth transistor is a P-type metal-oxide-semiconductor transistor, a gate of the fourth transistor is the control terminal of the switch, a drain of the fourth transistor is the first terminal of the switch, and a source of the fourth transistor is the second terminal of the switch.

Optionally, the control unit is a second voltage comparator, and the second specific potential is a ground potential; the second voltage comparator comprises a first input terminal, a second input terminal, a first voltage terminal, a second voltage terminal, and an output terminal, wherein the first input terminal is grounded, the second input terminal is electrically connected with the metal backplate, the first voltage terminal is grounded, the second voltage terminal is electrically connected with a negative-voltage supply terminal of a power supply, and the output terminal is electrically connected with a gate of the fourth transistor.

Optionally, the control unit is a second inverter; the second inverter comprises a fifth transistor, a sixth transistor and an output terminal, the fifth transistor is a P-type metal-oxide-semiconductor transistor, the sixth transistor is an N-type metal-oxide-semiconductor transistor; both a gate of the fifth transistor and a gate of the sixth transistor are electrically connected with the metal backplate, a source of the fifth transistor is grounded, a source of the sixth transistor is electrically connected with a negative-voltage supply terminal of a power supply, both a drain of the fifth transistor and a drain of the sixth transistor are electrically connected with the output terminal; the output terminal is electrically connected with the gate of the fourth transistor; and the second specific potential is a turn-on voltage of the fifth transistor.

Optionally, a peak value of a peak of the pulse modulation signal is greater than the turn-on voltage of the fifth transistor, a turn-on voltage of the sixth transistor is set such that the sixth transistor is turned on at the peak of the pulse modulation signal.

In a second respect, an embodiment of the present application provides a display panel including a conductive film layer and the above-mentioned backlight module.

Optionally, the conductive film layer includes a common electrode layer that is multiplexed as a touch electrode layer.

In a third respect, an embodiment of the present application provides a display device including a power supply and a driving chip, and the above-mentioned display panel.

Optionally, the driving chip includes a display driving circuit and a touch driving circuit.

BRIEF DESCRIPTION OF THE DRAWINGS

The above and/or additional aspects and advantages of the present application will become apparent and readily understood with reference to the drawings below, in which.

REFERENCE SIGNS

Figure 1:
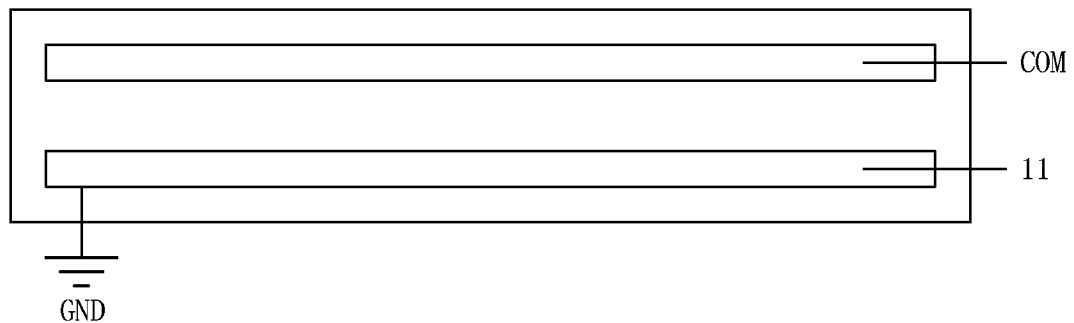
FIG. 1 is a schematic illustration of a structure of a display panel in the related art.

1—backlight module; 11—metal backplate; 12—control unit; 13—switch; 131—control terminal of the switch; 132—first terminal of the switch; 133—second terminal of the switch;

12*a*—first voltage comparator; 12*b*—first inverter; 12*c*—second voltage comparator; 12*d*—second inverter;

M1—first transistor; M2—second transistor; M3—third transistor; M4—fourth transistor; M5—fifth transistor; M6—sixth transistor;

G1—gate of the first transistor; G2—gate of the second transistor; G3—gate of the third transistor; G4—gate of the fourth transistor; G5—gate of the fifth transistor; G6—gate of the sixth transistor;

S1—source of the first transistor; S2—source of the second transistor; S3—source of the third transistor; S4—source of the fourth transistor; S5—source of the fifth transistor; S6—source of the sixth transistor;

D1—drain of the first transistor; D2—drain of the second transistor; D3—drain of the third transistor; D4—drain of the fourth transistor; D5—drain of the fifth transistor; D6—drain of the sixth transistor;

IN(+)—first input terminal; IN(−)—second input terminal; Out—output terminal; VDD—first voltage terminal; VEE—second voltage terminal;

VCC—positive-voltage input end of a power supply; VSS—negative-voltage input end of a power supply;

TVS—transient diode; m—conductive film layer; COM—common electrode layer.

DESCRIPTION OF THE EMBODIMENTS

In order to make the object, technical solutions and advantages of the embodiments of the invention apparent, the technical solutions of the embodiments will be described in a clearly and fully understandable way with reference to the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Unless otherwise defined, the technical or scientific terms used herein shall have ordinary meaning understood by one of ordinary skill in the art to which the invention belongs. The terms "first", "second," and the like used in the present disclosure are not intended to indicate any order, amount, or importance, but distinguish different constituent parts. The terms "comprise," "comprising," "include," "including," etc., means that an element or object preceding the word encompasses element(s) or object(s) listed after this word and equivalents thereof, without excluding other elements or objects. The terms "connected" or "connecting" and the like are not limited to physical or mechanical connections, but may include electrical connections, whether direct or indirect. "On", "under", "left", "right" and the like are only used to indicate relative positional relationships, and when an absolute position of an object described is changed, its relative positional relationship may also be changed accordingly.

Firstly, several terms involved in the present application are introduced and explained:

(1) electrostriction effect: refers to an elastic deformation phenomenon of an dielectric in an electric field, and the magnitude of the electrostriction effect is proportional to a field intensity; in general, since a changing electric field can make the dielectric vibrate due to the electrostriction effect, and then the stronger the electric field changes, the more obviously the dielectric vibrates due to the electrostriction effect.

(2) electric field coupling: also referred to as electrostatic coupling or capacitive coupling, which is a coupling manner generated due to existence of distributed capacitance; for example, when one plate of a capacitor inputs a changing signal, the other plate of the capacitor has the same changing signal under the electric field coupling effect.

An inventor (or inventors) of the present application considers that the backlight module generally employs a metal backplate (commonly as an iron backplate) in order to increase the reliability of the display panel. As shown in FIG. 1, a metal backplate 11 generally is grounded, that is, a potential of the metal backplate is consistent with the ground potential (the ground potential refers to the electrical ground potential in the present application). The display panel includes a plurality of conductive film layers, the conductive film layer and the metal backplate 11 constitute an equivalent capacitor Generally, the conductive film layer which constitutes an equivalent capacitor along with the metal backplate 11 is a common electrode layer COM, and in the existing display panel, a voltage of the common electrode layer COM is a constant voltage at a display stage. For some TDDI (Touch and Display Driver Integration) LCD (Liquid Crystal Display) products, when the common electrode layer COM is multiplexed as a touch electrode, the common electrode layer COM generally is input the pulse modulation signal as a touch scan signal.

There is a voltage difference between the common electrode layer COM and the ground potential, which is equivalent to that the above voltage difference is applied to both ends of the equivalent capacitor formed by the common electrode layer COM and the grounded metal backplate 11. When the display panel is at the display stage, the voltage on the common electrode layer COM is constant and the difference between the common electrode layer COM and the ground potential is not large (generally a value of the difference is a few tenths of a volt), thus the film layer in the display panel will not vibrate due to the electrostriction effect, which will not cause the screen body whistle. However, at a touch stage, the pulse modulation signal has a relatively high frequency, and a difference between a peak or a valley of the pulse modulation signal and the ground potential is relatively large, which make the film layer in the display panel vibrate due to the electrostriction effect, thus causing the screen body whistle.

The backlight module, the display panel and the display device provided by the present application can solve the technical problem that an equivalent capacitor is formed by the metal backplate and the conductive film layer in the display panel in the prior art, leading the screen body whistle of a certain conductive film layer in the display panel caused by the electrostriction.

The technical solutions of the present application and how the technical solutions of the present application solve the above technical problems will be illustrated below in detail with specific embodiments.

Figure 2:
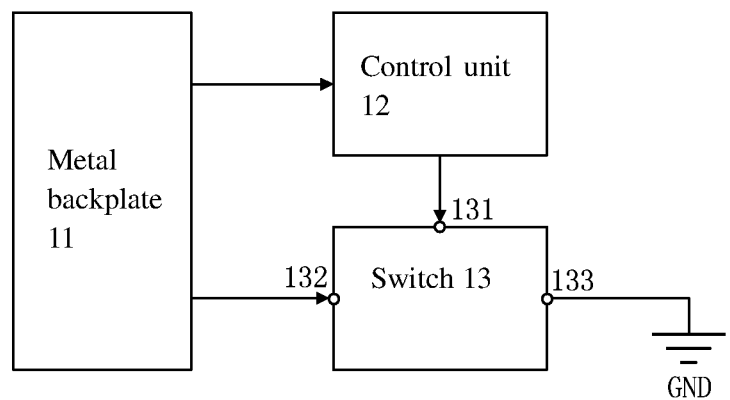
FIG. 2 is a schematic illustration of a structure of a backlight module provided by an embodiment of the present application.

The present embodiment provides a backlight module, as shown in FIG. 2, the backlight module including a metal backplate 11, a control unit 12, and a switch 13. The metal backplate 11 is applied with a coupling voltage under the effect of an electric field coupling, the control unit 12 is electrically connected with the metal backplate 11 and a control terminal 131 of the switch 13, respectively, and a first terminal 132 of the switch 13 is electrically connected to the metal backplate 11, and a second terminal 133 of the switch 13 is grounded, in which the control unit 12 controls whether the switch 13 is turned on depending on a value of the coupling voltage, thereby controlling whether the metal backplate 11 is grounded.

The backlight module provided by the present embodiment can control a potential of the metal backplate 11 by controlling whether the metal backplate 11 is grounded according to the value of the coupling voltage of the metal backplate 11, so that a potential difference between the metal backplate 11 and the conductive film layer in the display panel can be controlled, which can control the potential difference between both ends of the equivalent capacitor formed the conductive film layer and the metal backplate 11 within relatively small range, thereby effectively alleviating the problem of the screen body whistle of the film layer in the display panel caused by the electrostriction.

Figure 3:
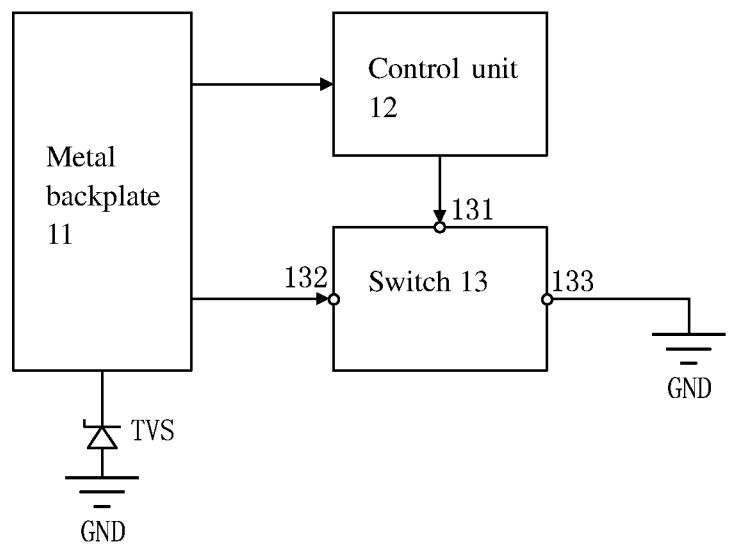
FIG. 3 is a schematic illustration of a structure of another backlight module provided by an embodiment of the present application.

Optionally, as shown in FIG. 3, in the backlight module provided by the present embodiment, the backlight module further includes a transient diode TVS having one terminal electrically connected with the metal backplate 11 and the other terminal grounded.

The metal backplate 11 may generate static electricity during the operation. If the metal backplate 11 generates static electricity without being grounded when the switch 13 is turned off, then it may cause a device in the backlight module, and even also a device in other structures in the display panel besides the backlight module, to be damaged by static electricity.

The present embodiment can release the static electricity on the metal backplate 11 via the transient diode TVS by setting the transient diode TVS, thereby protecting the security of the devices in the backlight module and in other structures in the display panel besides the backlight module.

For the display panel in which at the touch stage, a peak value of a peak of a pulse modulation signal is greater than a first specific potential, the metal backplate 11 should be disconnected from the ground at least when the pulse modulation signal is at the peak, so that the metal backplate 11 maintains the same coupling voltage as the peak of the pulse modulation signal, thereby reducing the voltage difference between the conductive film layer and the metal backplate 11, and further alleviating the screen body whistle of the film layer within the display panel caused by the electrostriction effect. For the display panel using such pulse modulation signal, the present application provides the following specific embodiments and these specific embodiments will be illustrated in detail below with reference to FIG. 4 to FIG. 7.

Figure 4:
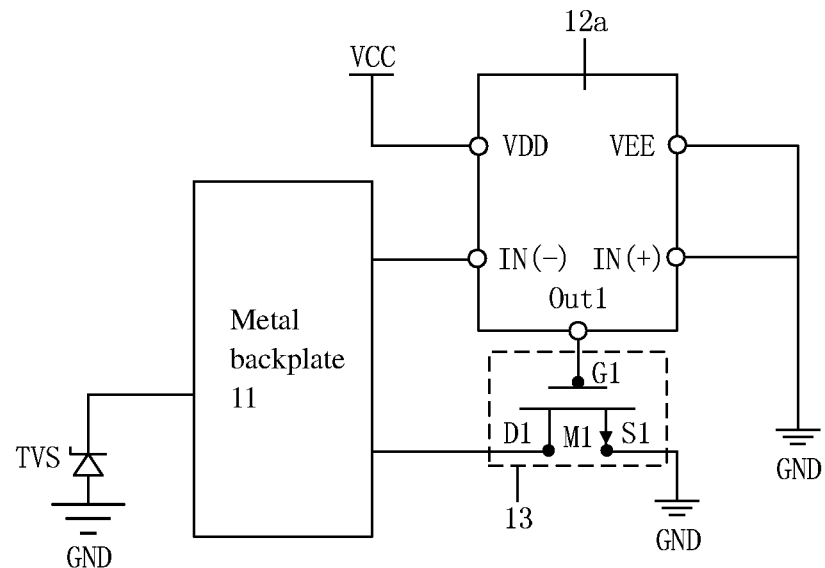
FIG. 4 is a schematic illustration of an exemplary structure of a backlight module provided by an embodiment of the present application.
Figure 6:
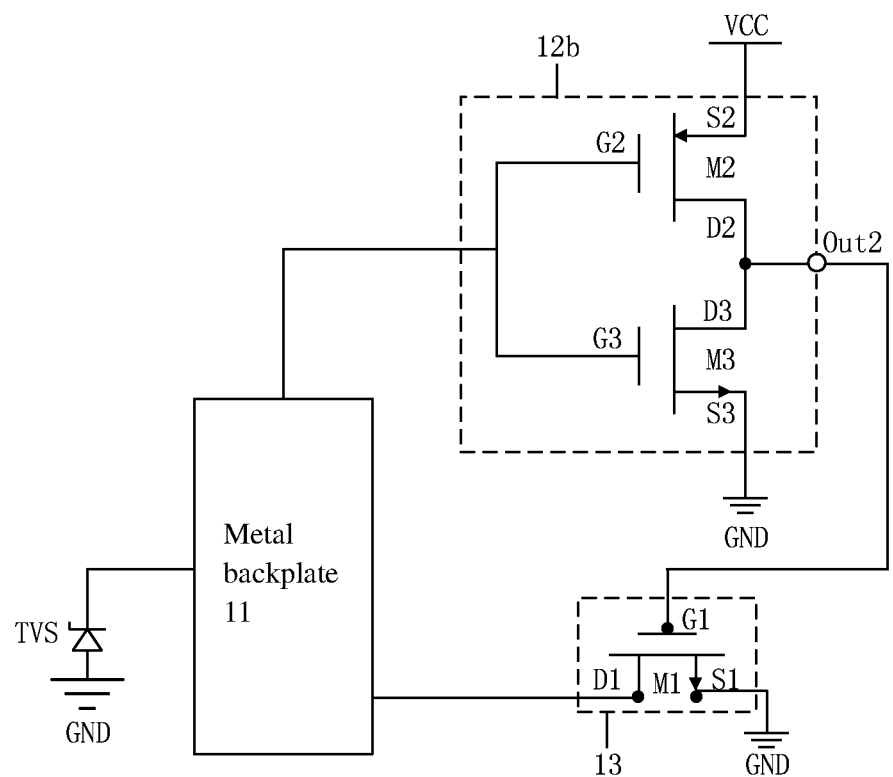
FIG. 6 is a schematic illustration of an exemplary structure of another backlight module provided by an embodiment of the present application.

As shown in FIG. 4 or FIG. 6, optionally, the switch 13 includes a first transistor M1, and the first transistor M1 is an N-type metal-oxide-semiconductor transistor, i.e., an NMOS transistor. The NMOS transistor is turned on when a high level is input to a gate of the NMOS transistor, and the NMOS transistor is turned off when a low level is input to the gate of the NMOS transistor. A gate G1 of the first transistor M1 is the control terminal 131 of the switch 13, a source S1 of the first transistor M1 is the first terminal 132 of the switch 13, and a drain D1 of the first transistor M1 is the second terminal 133 of the switch 13.

In a specific embodiment, as shown in FIG. 4, the present embodiment provides a backlight module, in which the control unit 12 is a first voltage comparator 12a.

For example, the first voltage comparator 12a includes a first input terminal IN(+), a second input terminal IN(−), a first voltage terminal VDD, a second voltage terminal VEE, and an output terminal Out, in which the first input terminal IN(+) is grounded, the second input terminal IN(−) is electrically connected with the metal backplate 11, the first voltage terminal VDD is electrically connected with a positive-voltage supply terminal VCC, the second voltage terminal VEE is grounded, and the output terminal Out is electrically connected with the gate G1 of the first transistor M1. A voltage between the first voltage terminal VDD and the second voltage terminal VEE is used to guarantee the normal operation of the voltage comparator 12a, i.e., the positive voltage is used for power supply.

Figure 5:
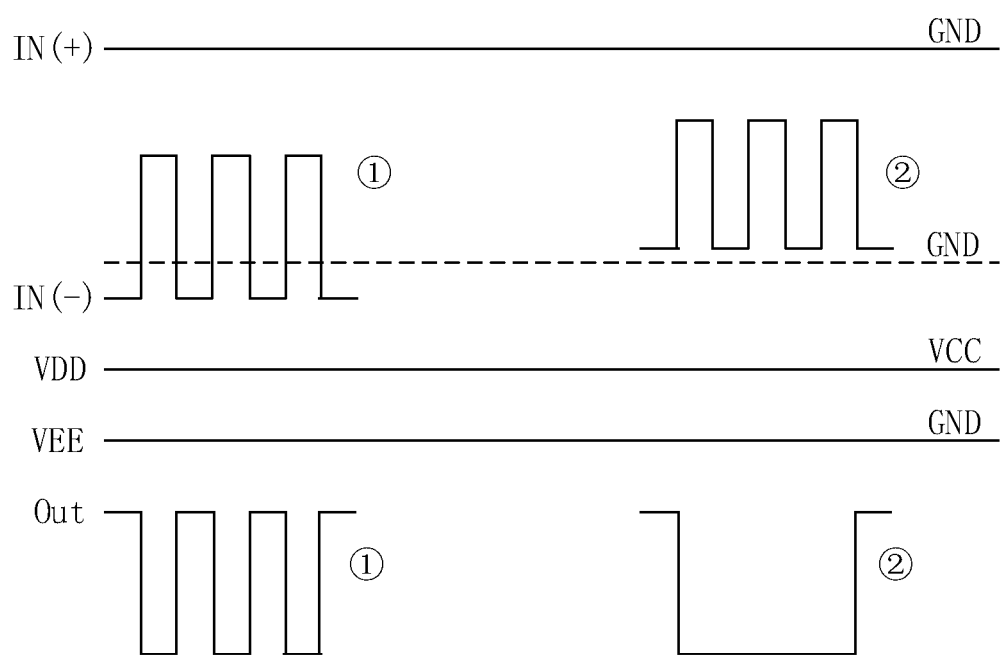
FIG. 5 is a time sequence control diagram of the backlight module shown in FIG. 4.

With reference to FIG. 4, and FIG. 5, the first specific potential is the ground potential (an earth potential), and there are two cases that a peak value of the peak of the pulse modulation signal is greater than ground potential, the second case is that a peak value of a valley of the pulse modulation signal is larger than the ground potential, and the first case is that the peak value of the valley of the pulse modulation signal is less than the ground potential.

For the second case, since the peak value of the valley of the pulse modulation signal is larger than the ground potential, then the coupling voltage of the metal backplate 11 when being at the valley is also higher than the ground potential, even when the coupling voltage of the metal backplate 11 is at the valley, a potential (GND) of the first input terminal IN(+) of the first voltage comparator 12a is lower than that of the second input terminal IN(−), and then the output terminal Out outputs a low level. As a result, when the metal backplate 11 is coupled with the pulse modulation signal, what is output by the output terminal Out is a continuous low level so that the first transistor M1 is continuously turned off, that is to say, the metal backplate 11 is disconnected with the ground when the metal backplate 11 is coupled with the pulse modulation signal, so that the coupling voltage of the metal backplate 11 is also substantially consistent with the pulse modulation signal, which can make the voltage difference between the metal backplate 11 and the conductive film layer substantially zero, and more importantly can ensure that the voltage difference of the equivalent capacitor formed by the conductive film layer and the metal backplate 11 is kept constant, thereby avoiding the electrostriction effect occurring in the film layer within the display panel.

For the first case, when the coupling voltage of the metal backplate 11 is at the peak, an input voltage of the second input terminal IN(−) of the first voltage comparator 12a is higher than the ground potential. At this time, a potential (the ground potential) of the first input terminal IN(+) of the voltage comparator 12a is less than the potential of the second input terminal IN(−), and then the output terminal Out outputs a low level and the first transistor M1 is turned off, that is the metal backplate 11 is disconnected with the ground so that the coupling voltage of the metal backplate 11 maintains a voltage of the peak of the current pulse modulation signal, at this time the voltage difference between the metal backplate 11 and the conductive film layer is substantially zero. When the coupling voltage of the metal backplate 11 is at the valley, an input voltage of the second input terminal IN(−) of the first voltage comparator 12a is lower than the ground potential. At this time, the potential (the ground potential) of the first input terminal IN(+) of the voltage comparator 12a is higher than the potential of the second input terminal IN(−), and then the output terminal Out outputs a high level and the first transistor M1 is turned on, that is the metal backplate 11 is connected with the ground so that the voltage of the metal backplate 11 is the ground potential. Since the difference between the voltage of the valley the pulse modulation signal and the ground potential is not large, the voltage difference between the metal backplate 11 and the conductive film layer is relatively small. As a result, although the potential difference between both terminals of the equivalent capacitor formed by the conductive film layer and the metal backplate changes periodically, the electrostriction effect can also be effectively reduced due to a very small change in the amplitude.

Figure 7:
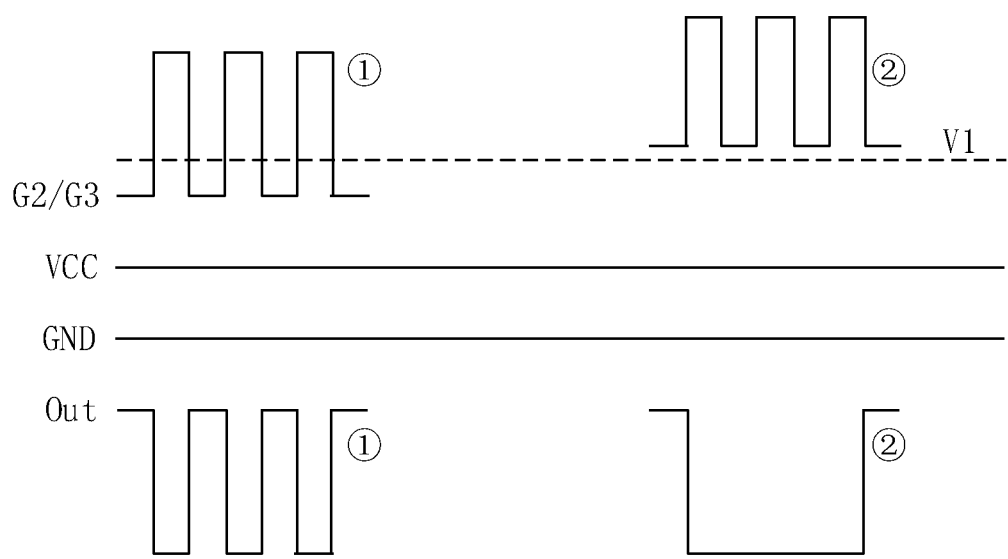
FIG. 7 is a time sequence control diagram of the backlight module shown in FIG. 6.
Figure 9:
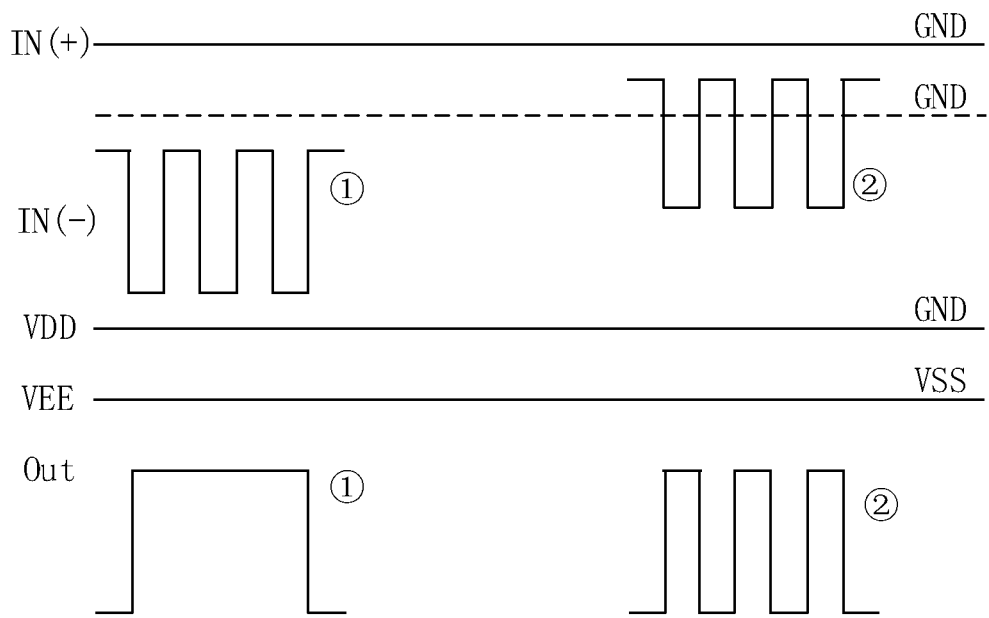
FIG. 9 is a time sequence control diagram of the backlight module shown in FIG. 8.
Figure 11:
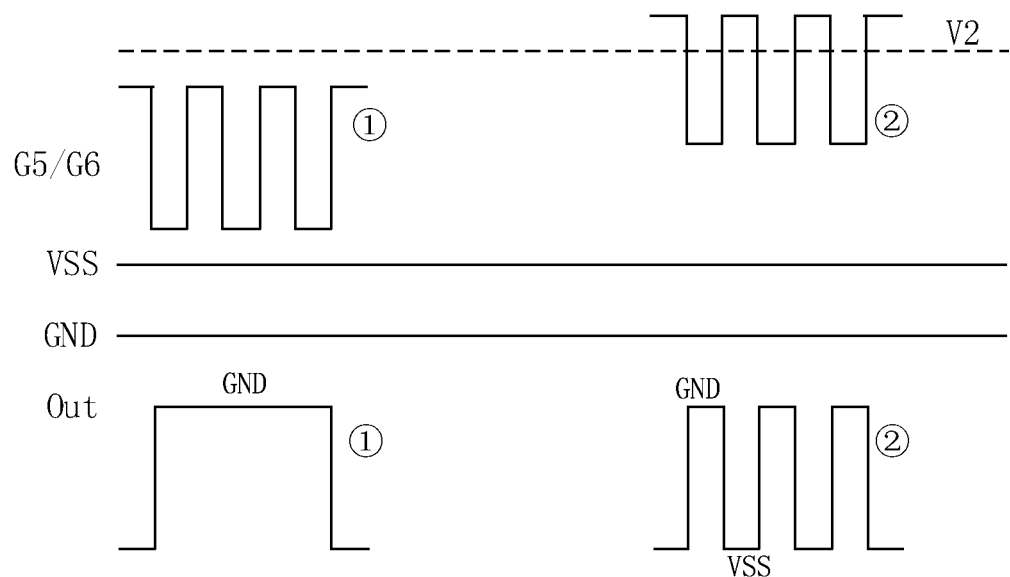
FIG. 11 is a sequence control diagram of the backlight module shown in FIG. 10.

It should be noted that, the pulse modulation signal in the first case and the pulse modulation signal in the second case shown in FIG. 5 are illustrated in the same figure only for the ease of comparison, and practically, the pulse modulation signal in the first case and the pulse modulation signal in the second case cannot coexist in the same display panel, but different display panels may select the pulse modulation signal in the first case or in the second case as a scan signal at the touch stage. In FIG. 7, FIG. 9 and FIG. 11, also for ease of comparison, the pulse modulation signal in the first case and the pulse modulation signal are depicted in the same figure, which will not be repeated hereinafter.

At a display stage, the coupling voltage of the metal backplate 11 is common voltage of the common electrode layer (which may be set to be slightly lower than the low level), i.e., an input voltage of the second input terminal IN(−) of the voltage comparator 12a is lower than the ground potential. At this time, the potential (GND) of the first input terminal IN(+) of the voltage comparator 12a is higher than the potential of the second input terminal IN(−), and then the first output terminal Out1 outputs a high level, the first transistor M1 is turned on, and the metal backplate 11 is connected with the ground.

In the present embodiment, using the first voltage comparator 12a as the control unit 12, when a peak value of the peak of the pulse modulation signal in the conductive film layer is greater than the ground potential, the electrostriction effect occurring in the film layer in the display panel can be effectively reduced and even avoided, and thereby the problem of the screen body whistle caused by the electrostriction can be improved and even completely avoided.

In another specific embodiment, as shown in FIG. 6, the present embodiment provides a backlight module, in which the control unit 12 is a first inverter 12b.

Specifically, the first inverter 12b includes a second transistor M2, a third transistor M3, and a second output terminal Out2. The second transistor M2 is a P-type metal-oxide-semiconductor transistor, i.e., a PMOS transistor, the third transistor M3 is an N-type metal-oxide-semiconductor transistor, i.e., an NMOS transistor. Both a gate G2 of the second transistor M2 and a gate G3 of the third transistor M3 are electrically connected with the metal backplate 11, a source S2 of the second transistor M2 is electrically connected with a power supply voltage terminal VCC, a source S3 of the third transistor M3 is grounded, and both a drain D2 of the second transistor M2 and a drain D3 of the third transistor M3 are electrically connected with the second output terminal Out2. The second output terminal Out2 is electrically connected with the gate G1 of first transistor M1.

With reference to FIG. 6 and FIG. 7, the first specific potential is a turn-on voltage V1 of the third transistor M3, i.e., $V1-V_{S3}=V1-V_{GND}=V_{th3}$, which can obtain $V1=V_{th3}+V_{GND}$. As seen, the threshold voltage $V_{th3}$ of the third transistor M3 may be designed to adapt the pulse modulation signal.

A case that the peak value of a peak of the pulse modulation signal is greater than the turn-on voltage V1 includes two cases: the second case is that a peak value of the valley of the pulse modulation signal is also greater than the turn-on voltage V1, and the first case is that a peak value of the valley of the pulse modulation signal is lower than the turn-on voltage V1.

For the second case, since the peak value of the peak of the pulse modulation signal is also greater than the turn-on voltage V1, the coupling voltage of the metal backplate 11 when being at the valley is also larger than the turn-on voltage V1. Even when the coupling voltage of the metal backplate 11 is at the valley, the third transistor M3 can also be turned on, and what is output by the second output terminal Out is a continuous low level (the ground potential) so that the first transistor M1 is continuously turned off, that is to say, the metal backplate 11 is disconnected with the ground when the metal backplate 11 is couple with the pulse modulation signal so that the coupling voltage of the metal backplate 11 is also substantially consistent with the pulse modulation signal, which can make the voltage difference between the metal backplate 11 and the conductive film layer substantially zero, and more importantly can ensure that the voltage difference in the equivalent capacitor formed by the conductive film layer and the metal backplate 11 is kept constant, thereby avoiding the electrostriction effect occurring in the film layer within the display panel.

For the first case, a turn-on voltage of the second transistor M2 may be set such that the second transistor M2 when being at a coupling voltage of the metal backplate 11 can be turned on. Then, the third transistor M3 is turned on when the coupling voltage of the metal backplate 11 is at the peak, and what is output by the second output terminal Out2 is the ground potential (a low level), thereby turning off the first transistor M1 so as to disconnect the metal backplate 11 from the ground and to keep the metal backplate 11 in the current high level. However, the second transistor M2 is turned on when the coupling voltage of the metal backplate 11 is at the valley, so that the second output terminal Out2 outputs the power supply voltage (VCC), the first transistor M1 is turned on so as to connect the metal backplate 11 with the ground, that is, the voltage of the metal backplate 11 is the ground potential. Since the difference between a voltage of the valley of the pulse modulation signal and the ground potential is not large, the voltage difference between the metal backplate 11 and the conductive film layer is relatively small. As a result, although the voltage difference between both terminals of the equivalent capacitor formed by the conductive film layer and the metal backplate changes periodically, the electrostriction effect can also be effectively reduced due to a very small change in the amplitude.

At the display stage, the coupling voltage of the metal backplate 11 is a coupling voltage of the common electrode layer (which is generally slightly less than the low level), and threshold voltages of the second transistor M2 and the third transistor M3 may be designed to turn off the third transistor M3 and to turn on the second transistor M2, the second output terminal Out2 outputs the high level, the first transistor M1 is turned on, and metal backplate 11 is grounded.

In the present embodiment, by using the first inverter 12b as the control unit 12, when a peak value of the peak of the pulse modulation signal in the conductive film layer is greater than the turn-on voltage V1 of the third transistor M3, the electrostriction effect occurring in the film layer of the display panel is effectively reduced and even avoided, and the problem of the screen body whistle caused by the electrostriction is improved and even completely avoided.

For the display panel in which a peak value of a valley of a pulse modulation signal, at the touch stage, is less than a second specific potential, the metal backplate 11 should be disconnected from the ground at least when the pulse modulation signal is at the peak, so that the metal backplate 11 maintains the same coupling voltage as the valley of the pulse modulation signal, thereby reducing the voltage difference between the conductive film layer and the metal backplate 11, and further alleviating the screen body whistle of the film layer within the display panel cause by the electrostriction effect. For the display panel using such pulse modulation signal, the present application provides the following specific embodiments and these specific embodiments will be illustrated in detail below with reference to FIG. 8 to FIG. 11.

Figure 8:
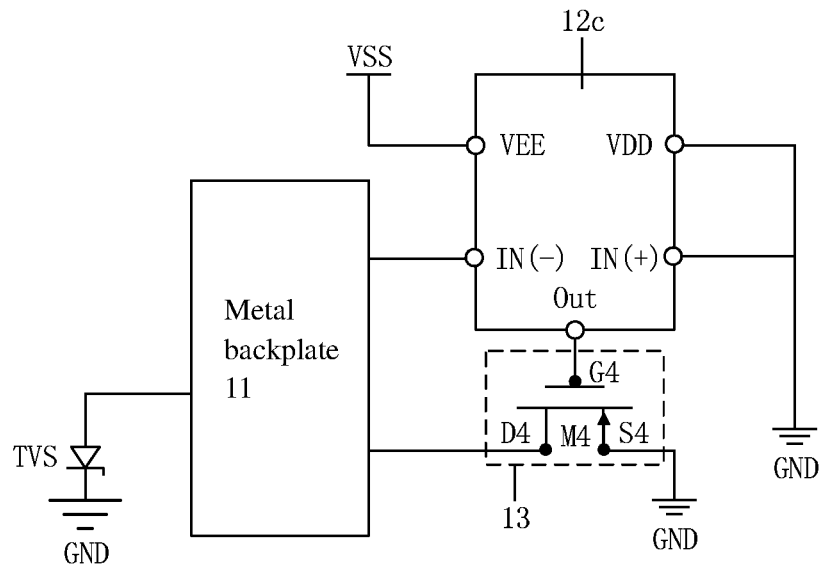
FIG. 8 is a schematic illustration of an exemplary structure of yet another backlight module provided by an embodiment of the present application.
Figure 10:
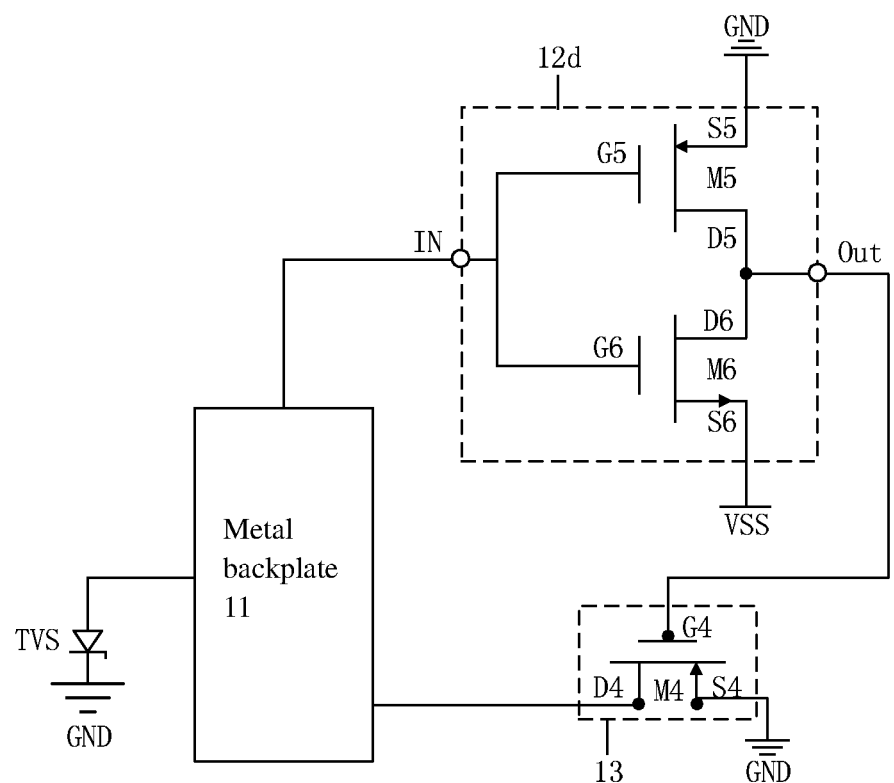
FIG. 10 is a schematic illustration of an exemplary structure of still yet another backlight module provided by an embodiment of the present application.

As shown in FIG. 8 or FIG. 10, optionally, the switch 13 includes a fourth transistor M4, and the fourth transistor M4 is a P-type metal-oxide-semiconductor transistor, i.e., a PMOS transistor. The PMOS transistor is turned off when a high level is input to a gate of the PMOS transistor, and is turned on when a low level is input to the gate of the PMOS transistor. Wherein, a gate G4 of the fourth transistor M4 is the control terminal 131 of the switch 13, a source S4 of the fourth transistor M4 is the first terminal 132 of the switch 13, and a drain D4 of the fourth transistor M4 is the second terminal 133 of the switch 13.

In a specific embodiment, as shown in FIG. 8, the present embodiment provides a backlight module, in which the control unit 12 is a second voltage comparator 12c.

For example, the second voltage comparator 12c includes a first input terminal IN(+), a second input terminal IN(−), a first voltage terminal VDD, a second voltage terminal VEE, and an output terminal Out, in which the first input terminal IN(+) is grounded, the second input terminal IN(−) is electrically connected with the metal backplate 11, the first voltage terminal VDD is grounded, the second voltage terminal VEE is electrically connected with a negative-voltage supply terminal VSS of a power supply, and the output terminal Out is electrically connected with the gate G4 of the fourth transistor M4. A voltage between the first voltage terminal VDD and the second voltage terminal VEE are used to guarantee the normal operation of the voltage comparator 12c, i.e., the negative voltage is used for power supply.

With reference to FIG. 8 and FIG. 9, the second specific potential is the ground potential, and there are two cases that a peak value of a valley of the pulse modulation signal is lower than ground potential, the first case is that a peak value of a peak of the pulse modulation signal is also lower than the ground potential, and the second case is that the peak value of the peak of the pulse modulation signal is larger than the ground potential.

For the first case, since the peak value of the peak of the pulse modulation signal is also lower than the ground potential, the coupling voltage of the metal backplate 11 when being at the peak is also higher than the ground potential, even when the coupling voltage of the metal backplate 11 is at the valley, a potential (the ground potential) of the first input terminal IN(+) of the second voltage comparator 12c is higher than that of the second input terminal IN(−), and then the output terminal Out outputs the high level. As a result, when the metal backplate 11 is coupled with the pulse modulation signal, what is output by the output terminal Out is a continuous high level so that the fourth transistor M4 is continuously turned off, that is to say, the metal backplate 11 is disconnected with the ground when the metal backplate 11 is coupled with the pulse modulation signal, so that the coupling voltage of the metal backplate 11 is also substantially consistent with the pulse modulation signal, which not only can make the voltage difference between the metal backplate 11 and the conductive film layer substantially zero, but also can ensure that the voltage difference in the equivalent capacitor formed by the conductive film layer and the metal backplate 11 is kept constant, thereby avoiding the electrostriction effect occurring in the film layer within the display panel.

For the second case, when the coupling voltage of the metal backplate 11 is at the valley, a input voltage of the second input terminal IN(−) of the second voltage comparator 12c is lower than the ground potential. At this time, the second voltage comparator 12c has the potential (the ground potential) of the first input terminal IN(+) higher than the potential of the second input terminal IN(−), and then the output terminal Out outputs a high level and the fourth transistor M4 is turned off, that is, the metal backplate 11 is disconnected with the ground so that the coupling voltage of the metal backplate 11 maintains the voltage of the valley of the current pulse modulation signal, at this time the voltage difference between the metal backplate 11 and the conductive film layer is substantially zero. when the coupling voltage of the metal backplate 11 is at the peak, a input voltage of the second input terminal IN(−) of the second voltage comparator 12c is higher than the ground potential. At this time, the voltage comparator 12c has the potential (the ground potential) of the first input terminal IN(+) lower than the potential of the second input terminal IN(−), and then the output terminal Out outputs a low level and the fourth transistor M4 is turned on, that is the metal backplate 11 is connected with the ground so that the voltage of the metal backplate 11 is the ground potential. Since a difference between a voltage of the peak of the pulse modulation signal and the ground potential is not large, the voltage difference between the metal backplate 11 and the conductive film layer is relatively small. As a result, although the potential difference between both terminals of the equivalent capacitor formed by the conductive film layer and the metal backplate 11 changes periodically, the electrostriction effect can also be effectively reduced due to a very small change in the amplitude.

At the display stage, the coupling voltage of the metal backplate 11 is a common voltage of the common electrode layer (which may be set to be slightly higher than the ground potential), i.e., an input voltage of the second input terminal IN(−) of the second voltage comparator 12c is higher than the ground potential. At this time, the second voltage comparator 12c has the potential (the ground potential) of the first input terminal IN(+) lower than the potential of the second input terminal IN(−), and then the output terminal Out outputs a low level, the fourth transistor M4 is turned on, and the metal backplate 11 is connected with the ground In the present embodiment, by using the second voltage comparator 12c as the control unit 12, when a peak value of a valley of the pulse modulation signal in the conductive film layer is lower than the ground potential, the electrostriction effect occurring in the film layer in the display panel can be effectively reduced and even avoided, and thereby the problem of the screen body whistle caused by the electrostriction can be improved and even completely avoided.

In another specific embodiment, as shown in FIG. 10, the present embodiment provides a backlight module, in which the control unit 12 is a second inverter 12d.

Specifically, the second inverter 12d includes a fifth transistor M5, a sixth transistor M6, and an output terminal Out. The fifth transistor M5 is a P-type metal-oxide-semiconductor transistor, i.e., a PMOS transistor, the sixth transistor M6 is an N-type metal-oxide-semiconductor transistor, i.e., an NMOS transistor. Both a gate G5 of the fifth transistor M5 and a gate G6 of the sixth transistor M6 are electrically connected with the metal backplate 11, a source S5 of the fifth transistor M5 is grounded, a source S6 of the sixth transistor M6 is electrically connected with a negative-voltage supply terminal VSS of a power supply, and both a drain D5 of the fifth transistor M5 and a drain D6 of the sixth transistor M6 are electrically connected with the output terminal Out. The output terminal Out is electrically connected with the gate G4 of fourth transistor M4.

With reference to FIG. 10 and FIG. 11, the second specific potential is a turn-on voltage V2 of the fifth transistor M5, i.e., $V2-V_{S5}=V2-V_{GND}=V_{th5}$, which can obtain $V2=V_{th5}+V_{GND}$. As seen, the threshold voltage $V_{th5}$ of the fifth transistor M5 may be designed to adapt the pulse modulation signal.

There are two cases that a peak value of the valley of the pulse modulation signal is less than the turn-on voltage V2, the first case is that a peak value of the peak of the pulse modulation signal is also lower than the turn-on voltage V2, and the second case is that the peak value of the peak of the pulse modulation signal is greater than the turn-on voltage V2.

For the first case, since the peak value of the peak of the pulse modulation signal is also lower than the turn-on voltage V2, the coupling voltage of the metal backplate 11 when being at the peak is also lower than the turn-on voltage V2. Even when the coupling voltage of the metal backplate 11 is at the peak, the fifth transistor M5 can also be turned on. What is output by the output terminal Out is a continuous ground potential so that the fourth transistor M4 is continuously turned off, that is, the metal backplate 11 is disconnected with the ground when the metal backplate 11 is couple with the pulse modulation signal, so that the coupling voltage of the metal backplate 11 is also substantially consistent with the pulse modulation signal, which not only can make the voltage difference between the metal backplate 11 and the conductive film layer substantially zero, but also can ensure that the voltage difference in the equivalent capacitor formed by the conductive film layer and the metal backplate 11 is kept constant, thereby avoiding the electrostriction effect occurring in the film layer within the display panel.

For the second case, a turn-on voltage of the sixth transistor M6 can be set such that when the coupling voltage of the metal backplate 11 is at the peak, the sixth transistor M6 can be turned on. Then, the fifth transistor M5 is turned on when the coupling voltage of the metal backplate 11 is at the valley, and what is output by the output terminal Out is the ground potential, so that the fourth transistor M4 is turned off to disconnect the metal backplate 11 from the ground and further to keep the metal backplate 11 in the current potential. However, the sixth transistor M6 is turned on when the coupling voltage of the metal backplate 11 is at the peak, and then the output terminal Out outputs the power supply negative voltage VSS so that the fourth transistor M4 is turned on in order to connect the metal backplate 11 with the ground, that is, the voltage of the metal backplate 11 is the ground potential. Since the difference between the voltage of the peak of the pulse modulation signal and the ground potential is not large, the voltage difference between the metal backplate 11 and the conductive film layer is relatively small. As a result, although the voltage difference between both terminals of the equivalent capacitor formed by the conductive film layer and the metal backplate 11 changes periodically, the electrostriction effect can also be effectively reduced due to a very small change in the amplitude.

At the display stage, the coupling voltage of the metal backplate 11 is a common voltage of the common electrode layer (which may be set to be slightly higher than the ground potential), and the threshold voltages of the fifth transistor M5 and the sixth transistor M6 may be designed so that the fifth transistor M5 is turned off and the sixth transistor M6 is turned on, the output terminal Out outputs the power supply negative voltage VSS, the fourth transistor M4 is turned on, and the metal backplate 11 is grounded.

In the present embodiment, by using the second inverter 12d as the control unit 12, when a peak value of the valley of the pulse modulation signal in the conductive film layer is lower than the turn-on voltage V2 of the fifth transistor M5, the electrostriction effect occurring in the film layer in the display panel is effectively reduced and even avoided, and the problem of the screen body whistle caused by the electrostriction is improved and even completely avoided.

Figure 12:
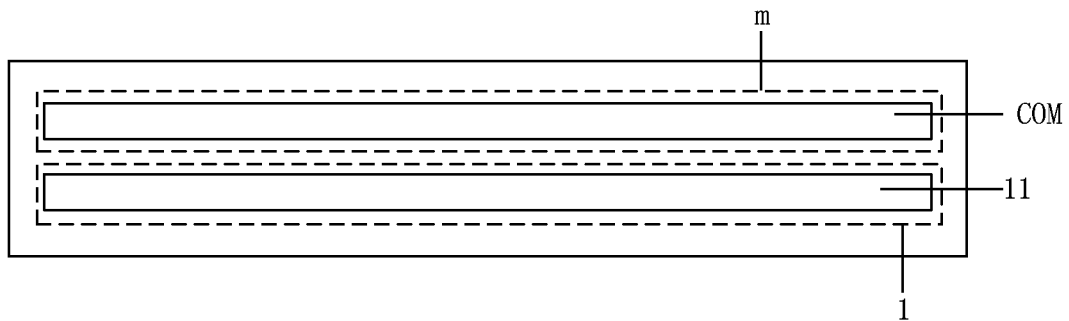
FIG. 12 is a schematic illustration of a structure of a display panel provided by an embodiment of the present application.

Based on the same inventive concept, the present embodiment provides a display panel, as shown in FIG. 12, the display panel includes a conductive film layer m and the backlight module 1 in the above embodiments, which has the beneficial effects of the backlight module 1 in the above embodiments, which will not be repeated herein.

Optionally, the conductive film layer m includes a common electrode layer COM that is multiplexed as a touch electrode layer.

Optionally, the conductive film layer further includes a gate layer, a source-drain electrode layer, a pixel electrode layer and the like.

Optionally, the display panel further includes an insulating layer between the adjacent conductive film layers, and both the conductive film layer and the insulating layer may vibrate as a result of the electrostriction.

When the display panel is at the display stage, a potential of the common electrode layer is a constant potential with very little difference from the ground potential and the metal backplate 11 is connected to the ground, as a result, the voltage difference between the metal backplate 11 and the common electrode layer COM is relatively lower and unchanged, which will not cause the screen body whistle problem due to the electrostriction.

When the display panel is at the touch stage, the common electrode layer is multiplexed as a touch electrode layer and a touch scan signal of the common electrode layer is a pulse modulation signal, and a coupling voltage of the metal backplate 11 is approximately the same as the pulse modulation signal, the metal backplate 11 is disconnected with the ground at least when the pulse modulation signal is at the peak (the peak of the pulse modulation signal is larger than the first specific potential) or the valley (the valley of the pulse modulation signal is smaller than the second specific potential), so that the voltage difference between the common electrode layer COM and the metal backplate 11 is constant, or a change in the amplitude of the voltage difference is relatively low, which will not lead the screen body whistle problem caused by the electrostriction occurring in the film layer in the display panel.

Figure 13:
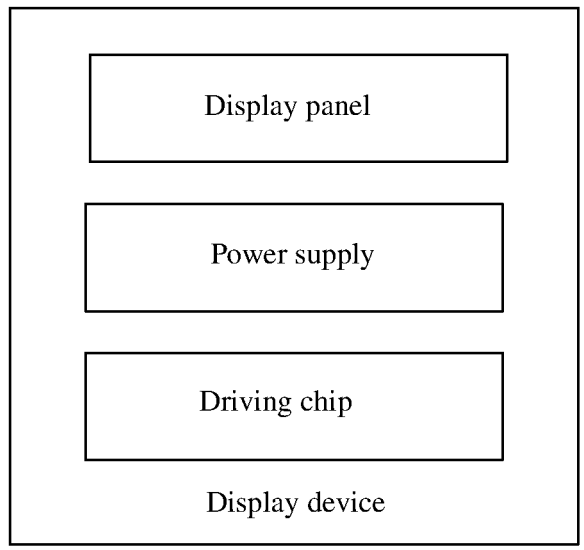
FIG. 13 is a schematic illustration of a structure of a display device provided by an embodiment of the present application.

Base on the same inventive concept, the present embodiment provides a display device, as shown in FIG. 13, the display device includes a power supply, a driving chip and the display panel in the above embodiments, which has the beneficial effects of the display panel in the above embodiments, which will not be repeated herein.

Specifically, the power supply in the present embodiment may be electrically connected with the positive-voltage input terminal VCC of the power supply in the above embodiments, or electrically connected with the negative voltage input terminal VSS in the above embodiments.

Specifically, the driving chip in the present embodiment includes a display driving circuit, and a touch driving circuit, i.e., the display panel is the TDDI LCD display device.

The following beneficial effects can be achieved by applying the embodiments of the present application:

The backlight module, the display panel and the display device provided by the present application embodiment can control the potential of the metal backplate by controlling whether the metal backplate is grounded according to the value of the coupling voltage of the metal backplate, so that the potential difference between the metal backplate and the conductive film layer in the display panel can be controlled, the potential difference between both terminals of the equivalent capacitor formed by the conductive film layer and the metal backplate can be controlled to be within a relatively small range, thereby effectively alleviating the problem of the screen body whistle of the film layer within the display panel caused by the electrostriction.

For the present disclosure, the following statements should be noted:

(1) The accompanying drawings involve only the structure(s) in connection with the embodiment(s) of the present disclosure, and other structure(s) can be referred to common design(s).

(2) For the purpose of clarity, in accompanying drawings for illustrating the embodiment(s) of the present disclosure, the thickness of a layer or a region may be enlarged, i.e., these drawings are not depicted at an actual scale.

(3) In case of no conflict, features in one embodiment or in different embodiments can be combined to obtain new embodiments.

The above description is only parts of the implementations of the present application. It should be noted that, for those of ordinary skill in the art, without departing from the principles of the present application, several improvements and retouches can be made, which also should be regarded as the protection scope of the present application.

This application claims priority to Chinese Patent Application No. 201911183817.6 filed Nov. 27, 2019, the disclosure of which is incorporated herein by reference as part of the application.

What is claimed is:

1. A backlight module, comprising:
   a metal backplate, applied with a coupling voltage under an electric field coupling action;
   a switch, comprising a control terminal, a first terminal and a second terminal, the first terminal being electrically connected with the metal backplate, and a second terminal being grounded;
   a control unit, electrically connected with the metal backplate and the control terminal of the switch, respectively; and
   a transient diode, one terminal of the transient diode being electrically connected with the metal backplate, and an other terminal of the transient diode being grounded,
   wherein the control unit controls whether the switch is turned on or turned off depending on a value of the coupling voltage, and the control unit controls whether the metal backplate is grounded.

2. The backlight module according to claim 1, wherein the coupling voltage is a pulse modulation signal, a peak value of a peak of the pulse modulation signal is larger than a first specific potential;
   the switch comprises a first transistor, the first transistor is an N-type metal-oxide-semiconductor transistor, a gate of the first transistor is the control terminal of the switch, a drain of the first transistor is the first terminal of the switch, and a source of the first transistor is the second terminal of the switch.

3. The backlight module according to claim 2, wherein the first specific potential is a ground potential, and the control unit is a first voltage comparator, the first voltage comparator comprises a first input terminal, a second input terminal, a first voltage terminal, a second voltage terminal, and an output terminal;

wherein both the first input terminal and the second voltage terminal are grounded, the second input terminal is electrically connected with the metal backplate, the first voltage terminal is electrically connected with a positive-voltage input terminal of a power supply, and the output terminal is electrically connected with the gate of the first transistor.

4. The backlight module according to claim 2, wherein the control unit is a first inverter, and the first inverter comprises a second transistor, a third transistor, and an output terminal;

the second transistor is a P-type metal-oxide-semiconductor transistor, the third transistor is an N-type metal-oxide-semiconductor transistor;

both a gate of the second transistor and a gate of the third transistor are electrically connected with the metal backplate, a source of the second transistor is electrically connected with a positive-voltage input terminal of a power supply, a source of the third transistor is grounded, both a drain of the second transistor and a drain of the third transistor are electrically connected with the output terminal, and the output terminal is electrically connected with the gate of the first transistor; and the first specific potential is a turn-on voltage of the third transistor.

5. The backlight module according to claim 4, wherein a peak value of a valley of the pulse modulation signal is less than the turn-on voltage of the third transistor, and a turn-on voltage of the second transistor is set such that the second transistor is turned on at the valley of the pulse modulation signal.

6. The backlight module according to claim 1, wherein the coupling voltage is a pulse modulation signal, a peak value of a valley of the pulse modulation signal is less than a second specific potential; and the switch comprises a fourth transistor, the fourth transistor is a P-type metal-oxide-semiconductor transistor, a gate of the fourth transistor is the control terminal of the switch, a drain of the fourth transistor is the first terminal of the switch, and a source of the fourth transistor is the second terminal of the switch.

7. The backlight module according to claim 6, wherein the control unit is a second voltage comparator, and the second specific potential is a ground potential;

the second voltage comparator comprises a first input terminal, a second input terminal, a first voltage terminal, a second voltage terminal, and an output terminal, wherein the first input terminal is grounded, the second input terminal is electrically connected with the metal backplate, the first voltage terminal is grounded, the second voltage terminal is electrically connected with a negative-voltage supply terminal of a power supply, and the output terminal is electrically connected with a gate of the fourth transistor.

8. The backlight module according to claim 6, wherein the control unit is a second inverter;

the second inverter comprises a fifth transistor, a sixth transistor and an output terminal, the fifth transistor is a P-type metal-oxide-semiconductor transistor, the sixth transistor is an N-type metal-oxide-semiconductor transistor; both a gate of the fifth transistor and a gate of the sixth transistor are electrically connected with the metal backplate, a source of the fifth transistor is grounded, a source of the sixth transistor is electrically connected with a negative-voltage supply terminal of a power supply, both a drain of the fifth transistor and a drain of the sixth transistor are electrically connected with the output terminal; the output terminal is electrically connected with the gate of the fourth transistor; and the second specific potential is a turn-on voltage of the fifth transistor.

9. The backlight module according to claim 8, wherein a peak value of a peak of the pulse modulation signal is greater than the turn-on voltage of the fifth transistor, a turn-on voltage of the sixth transistor is set such that the sixth transistor is turned on at the peak of the pulse modulation signal.

10. A display panel comprising a conductive film layer and the backlight module according to the claim 1.

11. The display panel according to claim 10, wherein the conductive film layer comprises a common electrode layer that is multiplexed as a touch electrode layer.

12. A display device comprising a power supply and a driving chip, and further comprising the display panel according to claim 10.

13. The display device according to claim 12, wherein the driving chip comprises a display driving circuit and a touch driving circuit.

* * * * *